(12) United States Patent
Glass et al.

(10) Patent No.: US 7,334,217 B2
(45) Date of Patent: Feb. 19, 2008

(54) EJECTION FAILURE MECHANISM

(75) Inventors: Adam B. Glass, Woodinville, WA (US); Jacob Oshins, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 595 days.

(21) Appl. No.: 10/405,726

(22) Filed: Apr. 2, 2003

(65) Prior Publication Data

US 2004/0199898 A1 Oct. 7, 2004

(51) Int. Cl.
*G06F 9/44* (2006.01)
(52) U.S. Cl. .................................... 717/121
(58) Field of Classification Search ............... 709/221, 709/223, 226, 229; 717/121, 120, 129, 130; 710/8, 19, 104; 707/202
See application file for complete search history.

(56) References Cited

U.S. PATENT DOCUMENTS

| | | | | |
|---|---|---|---|---|
| 5,630,184 | A * | 5/1997 | Roper et al. ................. | 709/221 |
| 5,809,329 | A | 9/1998 | Lichtman et al. | |
| 5,903,894 | A * | 5/1999 | Reneris ........................ | 707/100 |
| 5,923,897 | A | 7/1999 | Lipe et al. | |
| 6,006,342 | A | 12/1999 | Beardsley et al. | |
| 6,336,152 | B1 * | 1/2002 | Richman et al. ............. | 710/8 |
| 6,338,006 | B1 | 1/2002 | Jesionowski et al. | |
| 6,779,064 | B2 * | 8/2004 | McGowen et al. .......... | 710/104 |
| 2002/0023179 | A1 * | 2/2002 | Stanley ......................... | 710/8 |
| 2004/0015968 | A1 * | 1/2004 | Neiman et al. .............. | 718/100 |
| 2005/0071470 | A1 * | 3/2005 | O'Brien et al. ............. | 709/226 |
| 2005/0138291 | A1 * | 6/2005 | Neiman et al. .............. | 711/118 |
| 2006/0010232 | A1 * | 1/2006 | Page et al. ................... | 709/223 |
| 2006/0031842 | A1 * | 2/2006 | Neiman et al. .............. | 718/103 |
| 2006/0041656 | A1 * | 2/2006 | Li et al. ....................... | 709/223 |
| 2006/0053229 | A1 * | 3/2006 | Choi et al. ................... | 709/237 |

OTHER PUBLICATIONS

Manny Rayner, et al. "Plug and Play speech understanding" Sep. 2001, Association for Computation Linguistics, Proceedings of the Second SIGdial Workshop on Disclosure and Dialogue—vol. 16, pp. 1-10.*
Advanced Configuration Power Interface Specification Revision 2.0a. Compaq Computer Corporation. Intel Corporation. Microsoft Corporation, Phoenix Technologies Ltd., and Toshiba Corporation. pp. 166-171, Mar. 31, 2002.

* cited by examiner

*Primary Examiner*—Wei Zhen
*Assistant Examiner*—Ahna Deng
(74) *Attorney, Agent, or Firm*—Amin, Turocy & Calvin, LLP

(57) ABSTRACT

A system and method for an ejection failure mechanism is provided. The system receives a request to eject an ejectable resource, and, provides information associated with a failure of the ejection of the ejectable resource, if ejection of the ejectable resource is unsuccessful. The system thus provides a deterministic mechanism through which information associated with failure of the ejection of an ejectable resource can be communicated. As such, an initiator of the request to eject can receive information associated with a cause of the ejection failure.

17 Claims, 6 Drawing Sheets

EJECTION FAILURE MECHANISM

TECHNICAL FIELD

The present invention relates generally to computer system(s) and, more particularly, to an ejection failure mechanism for ejectable resource(s) of computer system(s).

BACKGROUND OF THE INVENTION

Configuration of computer system(s) (e.g., static and/or dynamic) can be a frustrating, complex process. Computer systems range from relatively simple systems to multi-processor complex systems. For example, high-end servers can include a plurality of hot-pluggable resource(s), a service processor and/or a management console. The service processor and/or the management console can control hardware that is visible to an Operating System-directed Configuration and Power Management system ("OSPM"). Typical scenarios include dynamic partitioning, capacity on demand, and ejection for uptime.

The Advance Configuration and Power Interface ("ACPI") specification defines an interface to a system board that facilitates operating system directed power management, resource management and system configuration. ACPI defines a standard way for a system board to describe its device configuration and power control hardware interface to an operating system. ACPI provides "control methods" that facilitate manipulating hardware in an ACPI system.

To enhance the functionality of an ACPI machine, the vendor can supply a function driver, which communicates with the ACPI BIOS through an operation region supplied by the driver. In one example, the ACPI driver accesses the operation region by calling an operation region handler supplied by the function driver. By communicating through ACPI operation regions, AML code in the BIOS can invoke device-specific operations that depend on the configuration of the driver and the host system.

ACPI is commonly employed in OSPM environments. The operating system uses ACPI AML (ACPI Machine Language) code stored in ACPI BIOS (Basic Input Output System) to identify devices that are present in a system and to facilitate loading appropriate device drivers for the identified devices.

The ACPI specification 2.0 ("ACPI 2.0") provides for ejectable resources (e.g., processors, memory, host bridges, etc. and hierarchical containers of same). Typically a management interface controls these resources via the service processor network. A goal of ACPI 2.0 is operating system independence.

Under ACPI 2.0, firmware is permitted to request that a device be ejected which causes the OSPM to attempt to eject the device.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention provides for a system and method for an ejection failure notification mechanism in which ejection failure is communicated back to firmware, thus allowing component(s) outside of the OSPM to be involved in an ejection failure scenario. For example, the system and/or method can be implemented in firmware. In accordance with an aspect of the present invention, an ejection failure mechanism system includes a plug and play manager having an ejection component.

The system provides a deterministic mechanism through which information associated with failure of the ejection of an ejectable resource can be communicated. As such, an initiator of the request to eject can receive information associated with a cause of the ejection failure. The information can comprise operating system specific ejection failure information communicated in a generic manner. For example, the information associated with cause(s) of the ejection failure can include: (1) the OSPM did not permit the ejection because ejection of the resource is not supported; (2) the OSPM did not permit the ejection because the device is still in use; (3) the OSPM did not permit the ejection because of a problem with a dependent device expressed directly or indirectly through the ejection relations; and/or (4) an application did not permit the ejection (e.g., indirectly through open handle(s)). Having received this information, the initiator of the request to eject can, for example, inform a user of the computer system of the failure, provide information associated with the cause of the failure and/or take corrective action to facilitate ejection.

The system receives a request to eject an ejectable resource and provides information associated with a failure of the ejection of the ejectable resource, if ejection of the ejectable resource is unsuccessful. The system facilitates communication of information associated with the failure of the request to eject the ejectable resource, for example, to firmware (e.g., BIOS) of a computer system (not shown). In one example, the system is a component of an operating system kernel (not shown). The system thus mitigates limitation(s) of conventional system(s) (e.g., based on ACPI 2.0) which fail to provide meaningful information associated with ejection failure(s).

In one example, the communication of information associated with failure of a request to eject an ejectable resource includes a buffer and/or reference to a buffer. The buffer can include, for example, detailed OSPM-specific information associated with the ejection failure. In another example, the communication of information associated with failure of a request to eject an ejectable resource includes a token and/or a gross-level code indicating a general class of failure. The token can include information that a managing controller/driver can utilize. For example, the managing controller/driver can launch a separate process to obtain and/or analyze context information and/or related details about the failure as necessary. Additionally and/or alternatively, the token can be brought back to the host OSPM to facilitate retrieval by the OSPM of specific information associated with the cause of the ejection failure and/or potential corrective action(s).

The plug and play manager manages ejectable resource(s). For example, the plug and play manager can load device driver(s) associated with the ejectable resource(s) and other device(s). The plug and play manager can further manage access to the ejectable resource(s).

The ejection component facilitates ejection of ejectable resource(s) based, at least in part, upon receipt of a request to eject the removable medium. The request can be received from a notification component of a platform component (not shown) (e.g., firmware and/or BIOS). For example, a management interface (not shown) can initiate the request by causing a Notify (3) to be invoked by the OSPM on the targeted ejectable resource.

Based upon the request, the ejection component can initiate ejection of the ejectable resource. For example, the ejection component can unload driver(s) associated with the ejectable resource, facilitate closing handle(s) to the ejectable resource and/or clean-up state associated with the ejectable resource. In the event that the ejectable resource can be successfully ejected, the ejection component can provide information associated with the ejection success, for example, to the notification component, in accordance with ACPI 2.0 (e.g., by causing an "_EJx" method to be invoked). However, in the event that ejection of the ejectable resource is unsuccessful (e.g., fails), the ejection component can provide information associated with the failure.

In one example, the ejection component communicates information associated with failure of a request to eject an ejectable resource utilizing a buffer and/or reference to a buffer. The buffer can include, for example, detailed OSPM-specific information associated with the ejection failure. In another example, the ejection component employs a token to communicate information associated with failure of the request to eject the ejectable resource. The token can include information that a managing controller/driver can utilize.

In another example, the ejection component can provide information associated with the failure to a notification component (e.g., by causing an "_EJF" control method to be invoked). This control method can be used by the OSPM to indicate ejection failure and communicate cause(s) of the ejection failure. The _EJF method can be supplied in circumstances in which a device object has a corresponding _EJx method and the platform firmware requires information associated with failure of an ejection request (e.g., cause(s)). The ejection component can invoke the _EJx method with a first argument that can provide OSPM generic failure information (e.g., coarse generic OSPM-independent information regarding the ejection failure).

The ejection component can further provide a second argument that can provide OSPM specific detailed failure information (e.g., a buffer containing detailed OSPM-specific information about why the ejection failed). The second argument can be provided for the scenario in which a service processor and/or management console (not shown) desire to know that the ejection request has failed along with reason (s) for the failure.

The notification component receives a request to eject an ejectable resource, for example, from a service processor. Thereafter, the notification component provides at least some of the information to a plug and play manager, and, receives information associated with a failure of the ejection of the ejectable resource from the plug and play manager, if ejection of the ejectable resource is unsuccessful (e.g., via buffer and/or token).

Yet another aspect of the present invention provides for an ejection failure mechanism system comprising a plug and play manager having an ejection component and a platform component having a notification component. Optionally, the system can further include a service processor and/or a management console.

The service processor controls computer hardware (e.g., memory, disc(s), DVD(s), CD(s) etc.) visible to the OSPM. For example, despite the physical presence and/or functionality of certain computer hardware (e.g., RAM), the service processor can prevent use of the computer hardware by the OSPM (e.g., logically removed from system).

The management console facilitates management of the system. For example, the management console can comprise input device(s) and/or output device(s). Administrator(s) and/or user(s) of the system can receive information and/or provide information via the management console.

The service processor provides information associated with the request to the notification component of the platform component (e.g., by causing a Notify (3) to be invoked by the OSPM on the ejectable resource). The notification component provides information associated with the request to the ejection component of the plug and play manager.

Based upon the request, the ejection component can initiate ejection of the ejectable resource. For example, the ejection component can unload driver(s) associated with the ejectable resource, facilitate closing handle(s) to the ejectable resource and/or clean-up state associated with the ejectable resource. In the event that the ejectable resource can be successfully ejected, the ejection component can provide information associated with the ejection success, for example, to the notification component, in accordance with ACPI 2.0 (e.g., by causing an "_EJx" method to be invoked). However, in the event that ejection of the ejectable resource is unsuccessful (e.g., fails), the ejection component can provide information associated with the failure to the notification component.

The notification component can provide operating system specific information to the service processor associated with the ejection failure. The service processor can provide this information to the user via the management console.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

GLOSSARY OF TERMS

Figure 1:
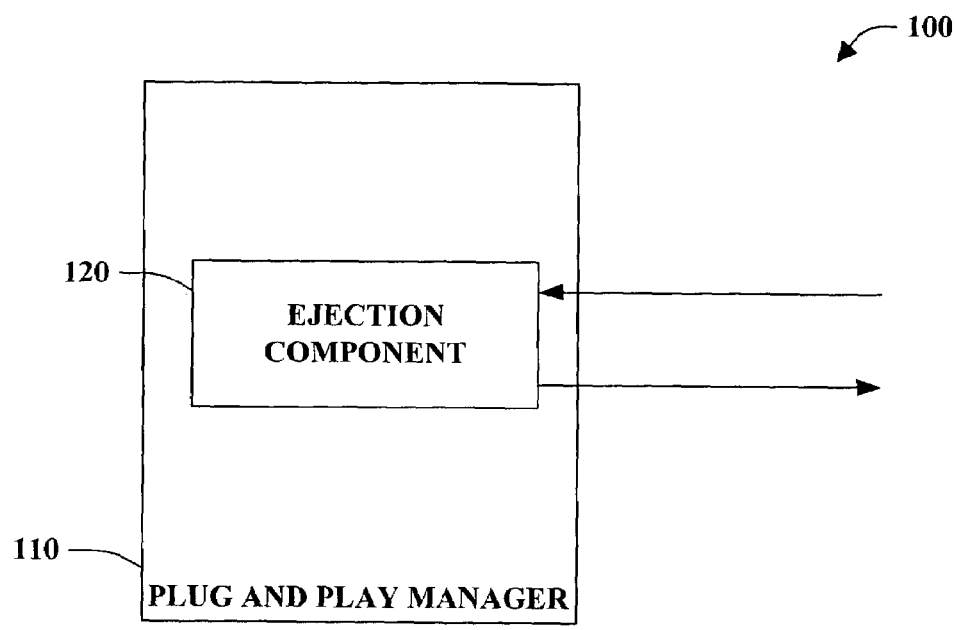
FIG. 1 is a block diagram of an ejection failure mechanism system in accordance with an aspect of the present invention.

OSPM—An operating system component that interacts with ACPI firmware and/or hardware.

Plug and Play manager—Refers to an operating system component that handles device configuration, including matching a device with a driver, preparing that device for use, and/or then preparing the device for removal, if necessary.

ACPI BIOS—Refers to system firmware, usually from a ROM and/or flash memory device, which is involved in runtime management of device(s).

Device—A discreet physical resource present in a computer system.

Device driver—Refers generally to software that runs in an operating system context which controls a device.

Platform—Specific group of devices that an operating system runs on, sometimes referred to as motherboard, mainboard, planar.

ASL—ACPI Source Language which is used by programmer(s) (e.g., human(s)) to write the ACPI BIOS.

AML—ACPI Machine Language which is used by computers to represent the ACPI BIOS. ASL becomes AML with an assembler. It is not a native machine language; it is is interpreted by the operating system via an interpreter.

Control Method—Refers to an object within the ACPI BIOS that is made up of AML. It can take argument(s) and return value(s). A control method can manipulate platform hardware by referencing operation region(s). The OSPM can use control method(s) for querying the state of a device and/or for changing the state of a device.

Operation Region—Refers to an ACPI BIOS data structure, comprised of AML, which describes a physical or virtual aperture through which an OS can read and/or write to a device (e.g., memory or I/O ranges). For example, a platform device can be controlled through I/O ports 0xe200 through 0xe20f. If an ACPI BIOS Control Method wants the OS to read from those ports, its AML will reference an Operation Region of Type I/O with a starting address of 0xe200 and a length of 0x10. The AML Interpreter within OSPM will then carry out whatever actions are appropriate for the machine that it is running on which correspond to reading those I/O ports. In another example, a Device Driver for a Service Processor may expose an Operation Region for virtual "hardware" which Control Methods would "write to" in order to send data to the Service Processor.

Service Processor—Platform component intended to augment the BIOS. It can run even when the rest of the machine is physically shut off. It can communicate with the BIOS, sometimes by means of a Device Driver.

Management Console—Platform component possibly attached to a Service Processor, which allows an administrator to interact with the Service Processor directly.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the term "computer component" is intended to refer to a computer-related entity, either hardware, a combination of hardware and software, software, or software in execution. For example, a computer component may be, but is not limited to being, a process running on a processor, a processor, an object, an executable, a thread of execution, a program, and/or a computer. By way of illustration, both an application running on a server and the server can be a computer component. One or more computer components may reside within a process and/or thread of execution and a component may be localized on one computer and/or distributed between two or more computers.

Further, "ejectable resource" is intended to refer to a computer resource comprising hardware and/or software which can be removed either physically and/or logically from a computer system (e.g., server). Processor(s), memory module(s), host bridge(s), computer media (e.g., floppy disc(s), compact disc(s) and/or DVD(s)) and/or hierarchical container(s) thereof are examples of ejectable resources.

Referring to FIG. 1, an ejection failure mechanism system 100 in accordance with an aspect of the present invention is illustrated. The system 100 includes a plug and play manager 110 having an ejection component 120.

The system 100 receives a request to eject an ejectable resource, and, provides information associated with a failure of the ejection of the ejectable resource, if ejection of the ejectable resource is unsuccessful. The system 100 facilitates communication of information associated with the failure of the request to eject the ejectable resource, for example, to firmware (e.g., BIOS) of a computer system (not shown). In one example, the system 100 is a component of an operating system kernel (not shown). The system 100 thus mitigates limitation(s) of conventional system(s) (e.g., based on ACPI 2.0) which fail to provide meaningful information associated with ejection failure(s).

The system 100 provides a deterministic mechanism through which information associated with failure of the ejection of an ejectable resource can be communicated. As such, an initiator of the request to eject can receive information associated with a cause of the ejection failure. The information can comprise operating system specific ejection failure information communicated in a generic manner. For example, the information associated with cause(s) of the ejection failure can include: (1) the OSPM did not permit the ejection because ejection of the resource is not supported; (2) the OSPM did not permit the ejection because the device is still in use; (3) the OSPM did not permit the ejection because of a problem with a dependent device expressed directly or indirectly through the ejection relations; and/or (4) an application did not permit the ejection (e.g., indirectly through open handle(s)). Having received this information, the initiator of the request to eject can, for example, inform a user of the computer system of the failure, provide information associated with the cause of the failure and/or take corrective action to facilitate ejection.

In one example, the communication of information associated with failure of a request to eject an ejectable resource includes a buffer and/or reference to a buffer. The buffer can include, for example, detailed OSPM-specific information associated with the ejection failure. In another example, the communication of information associated with failure of a request to eject an ejectable resource includes a token and/or a gross-level code indicating a general class of failure. The token can include information that a managing controller/ driver can utilize. For example, the managing controller/ driver can launch a separate process to obtain and/or analyze context information and/or related details about the failure as necessary. Additionally and/or alternatively, the token can be brought back to the host OSPM to facilitate retrieval by the OSPM of specific information associated with the cause of the ejection failure and/or potential corrective action(s).

For convenience, the system 100 will be explained with respect to ACPI 2.0; however, the present invention is not limited to implementation with regard to ACPI 2.0. It is to be appreciated that any type of operating system suitable for carrying out the present invention can be employed and all such types of systems are intended to fall within the scope of the hereto appended claims.

The plug and play manager 110 manages ejectable resource(s). For example, the plug and play manager 110 can load device driver(s) associated with the ejectable resource (s) and other device(s). The plug and play manager 110 can further manage access to the ejectable resource(s). Additionally, in accordance with an aspect of the present invention, the plug and play manager 110 can further facilitate ejection of the ejectable resource(s).

The ejection component 120 facilitates ejection of ejectable resource(s) based, at least in part, upon receipt of a request to eject the removable medium. The request can be received from a notification component of a platform component (not shown) (e.g., firmware and/or BIOS). For example, a management interface (not shown) can initiate the request by causing a Notify (3) to be invoked by the OSPM on the targeted ejectable resource.

Based upon the request, the ejection component 120 can initiate ejection of the ejectable resource. For example, the ejection component 120 can unload driver(s) associated with the ejectable resource, facilitate closing handle(s) to the ejectable resource and/or clean-up state associated with the ejectable resource. In the event that the ejectable resource can be successfully ejected, the ejection component 120 can provide information associated with the ejection success, for example, to the notification component, in accordance with ACPI 2.0 (e.g., by causing an "_EJx" method to be invoked). An EJx method can provide information to firmware and/or a service process (e.g., to physically eject the device). However, in the event that ejection of the ejectable resource is unsuccessful (e.g., fails), the ejection component 120 can provide information associated with the failure.

In one example, the ejection component 120 communicates information associated with failure of a request to eject an ejectable resource utilizing a buffer and/or reference to a buffer. The buffer can include, for example, detailed OSPM-specific information associated with the ejection failure. In another example, the ejection component 120 employs a token to communicate information associated with failure of the request to eject the ejectable resource. The token can include information that a managing controller/driver can utilize. For example, the managing controller/driver can launch a separate process to obtain and analyze context information and/or related details about the failure as necessary. Additionally and/or alternatively, the token can be brought back to the host OSPM to facilitate retrieval by the OSPM of specific information associated with the cause of the ejection failure and/or potential corrective action(s).

In one example, the ejection component 120 can provide information associated with the failure to a notification component (e.g., by causing an "_EJF" control method to be invoked). This control method can be used by the OSPM to indicate ejection failure and communicate cause(s) of the ejection failure. The _EJF method can be supplied in circumstances in which a device object has a corresponding _EJx method and the platform firmware requires information associated with failure of an ejection request (e.g., cause(s)). The ejection component 120 can invoke the _EJx method with a first argument that can provide OSPM generic failure information (e.g., coarse generic OSPM-independent information regarding the ejection failure), for example:

0—Unknown failure
1—Ejection not supported by OSPM
2—Device in use by application
3—Device Busy
4—Ejection dependency is busy or not supported for ejection by OSPM The ejection component 120 can further provide a second argument that can provide OSPM specific detailed failure information (e.g., a buffer containing detailed OSPM-specific information about why the ejection failed). The second argument can be provided for the scenario in which a service processor and/or management console (not shown) desire to know that the ejection request has failed along with reason (s) for the failure.

While FIG. 1 is a block diagram illustrating components for the staged mixture model 100, it is to be appreciated that the ejection failure mechanism system 100, the plug and play manager 110, and/or the ejection component 120 can be implemented as one or more computer components, as that term is defined herein. Thus, it is to be appreciated that computer executable components operable to implement the ejection failure mechanism system 100, plug and play manager 110, ejection component 120 can be stored on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the present invention.

Figure 2:
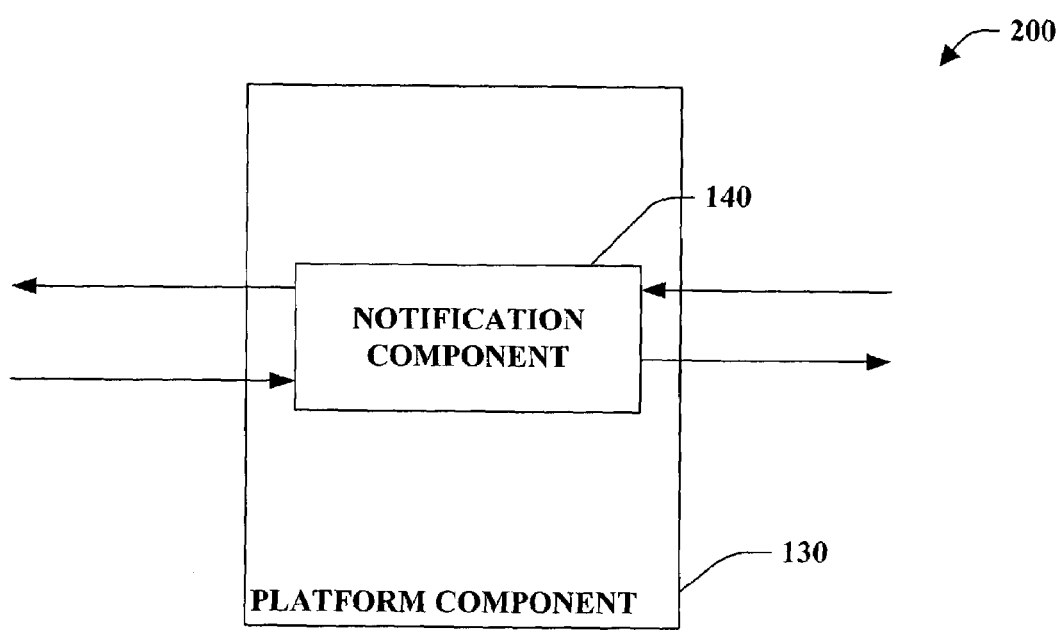
FIG. 2 is a block diagram of an ejection failure Mechanism system in accordance with an aspect of the present invention.

Turning to FIG. 2, an ejection failure mechanism system 200 in accordance with an aspect of the present invention is illustrated. The system 200 comprises a platform component 130 having a notification component 140.

The platform component 130 can be a component of a computer system's platform firmware (e.g., BIOS). For example, the platform component 130 can be stored in non-volatile memory (e.g., ROM) that is read from at system start-up (e.g., boot-up). The platform component 130 supports ejectable resource(s).

The notification component 140 receives a request to eject an ejectable resource, for example, from a service processor (not shown). Thereafter, the notification component 140 provides at least some of the information to a plug and play manager (not shown), and, receives information associated with a failure of the ejection of the ejectable resource from the plug and play manager, if ejection of the ejectable resource is unsuccessful (e.g., via buffer and/or token, as set forth supra).

It is to be appreciated that the ejection failure mechanism system 200, the platform component 130 and/or the notification component 140 can be computer components as that term is defined herein.

Figure 3:
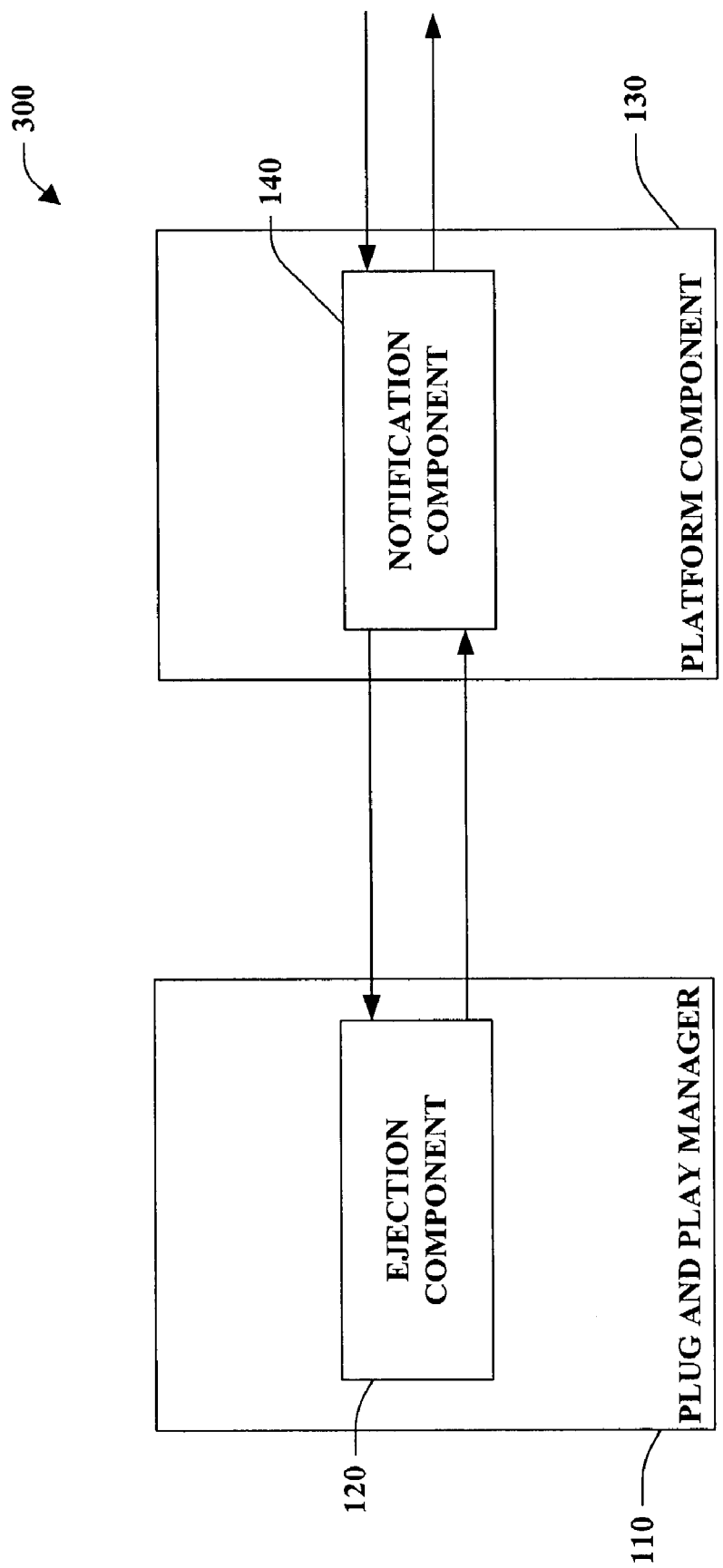
FIG. 3 is a block diagram of an ejection failure mechanism system in accordance with an aspect of the present invention.

Next, referring to FIG. 3, an ejection failure mechanism system 300 in accordance with an aspect of the present invention is illustrated. The system 300 includes a plug and play manager 110 having an ejection component 120 and a platform component 130 having a notification component

Figure 4:
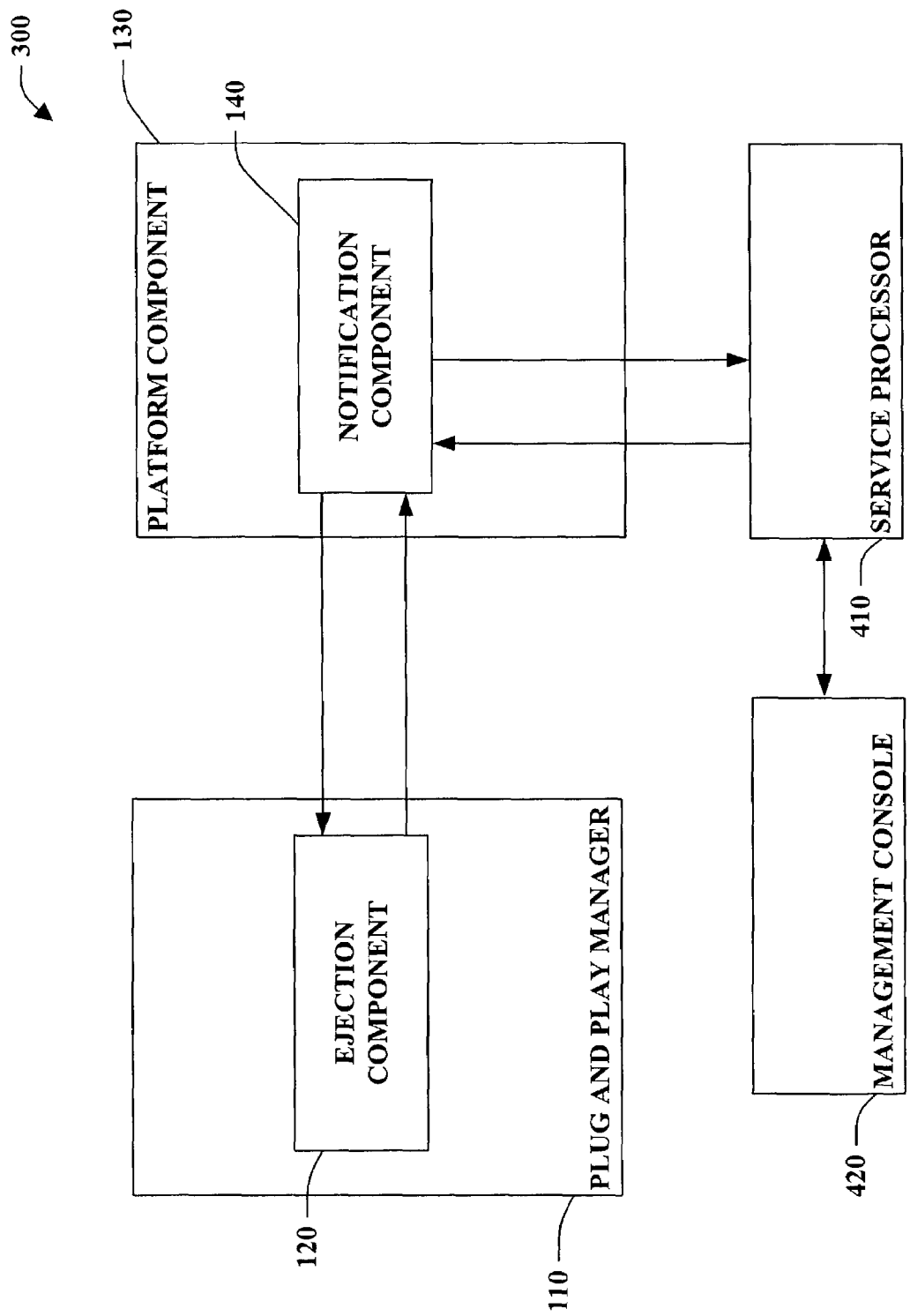
FIG. 4 is a block diagram of an ejection failure mechanism system in accordance with an aspect of the present invention.

140. As illustrated in FIG. 4, the system 300 can, optionally, include a service processor 410 and/or a management console 420.

The system 300 provides a deterministic mechanism through which information associated with failure of the ejection of an ejectable resource can be communicated, for example, to the service processor 410. For example, the information can include: (1) the OSPM did not permit the ejection because ejection of the resource is not supported; (2) the OSPM did not permit the ejection because the device is still in use; (3) the OSPM did not permit the ejection because of a problem with a dependent device expressed directly or indirectly through the ejection relations; and/or (4) an application did not permit the ejection (e.g., indirectly through open handle(s)).

The service processor 410 controls computer hardware (e.g., memory, disc(s), DVD(s), CD(s) etc.) visible to the OSPM. For example, despite the physical presence and/or functionality of certain computer hardware (e.g., RAM), the service processor 410 can prevent use of the computer hardware by the OSPM (e.g., logically removed from system).

The management console 420 facilitates management of the system 300. For example, the management console 420 can comprise input device(s) (not shown) (e.g., a keyboard, computer mouse and/or point device) and/or output device(s) (not shown) (e.g., computer monitor(s), speaker(s) etc.). Administrator(s) and/or user(s) of the system 300 can receive information and/or provide information via the management console 420.

In one example, a user of the system 300 desires to eject an ejectable resource. The user provides information associated with a request to eject the ejectable resource via the management console 420 (e.g., keyboard). The management console 420 provides information associated with the request to the service processor 410.

The service processor 410 provides information associated with the request to the notification component 140 of the platform component 130 (e.g., by causing a Notify (3) to be invoked by the OSPM on the ejectable resource). The notification component 140 provides information associated with the request to the ejection component 120 of the plug and play manager 110.

Based upon the request, the ejection component 120 can initiate ejection of the ejectable resource. For example, the ejection component 120 can unload driver(s) associated with the ejectable resource, facilitate closing handle(s) to the ejectable resource and/or clean-up state associated with the ejectable resource. In the event that the ejectable resource can be successfully ejected, the ejection component 120 can provide information associated with the ejection success, for example, to the notification component 140, in accordance with ACPI 2.0 (e.g., by causing an "_EJx" method to be invoked). However, in the event that ejection of the ejectable resource is unsuccessful (e.g., fails), the ejection component 120 can provide information associated with the failure to the notification component 140.

In one example, the ejection component 120 communicates information associated with failure of a request to eject an ejectable resource utilizing a buffer and/or reference to a buffer. The buffer can include, for example, detailed OSPM-specific information associated with the ejection failure. In another example, the ejection component 120 employs a token to communicate information associated with failure of the request to eject the ejectable resource. The token can include information that a managing controller/driver can utilize. For example, the managing controller/driver can launch a separate process to obtain and analyze context information and/or related details about the failure as necessary. Additionally and/or alternatively, the token can be brought back to the host OSPM to facilitate retrieval by the OSPM of specific information associated with the cause of the ejection failure and/or potential corrective action(s).

The notification component 140 can provide operating system specific information to the service processor 410 associated with the ejection failure. The service processor 410 can provide this information to the user via the management console 420.

Figure 5:
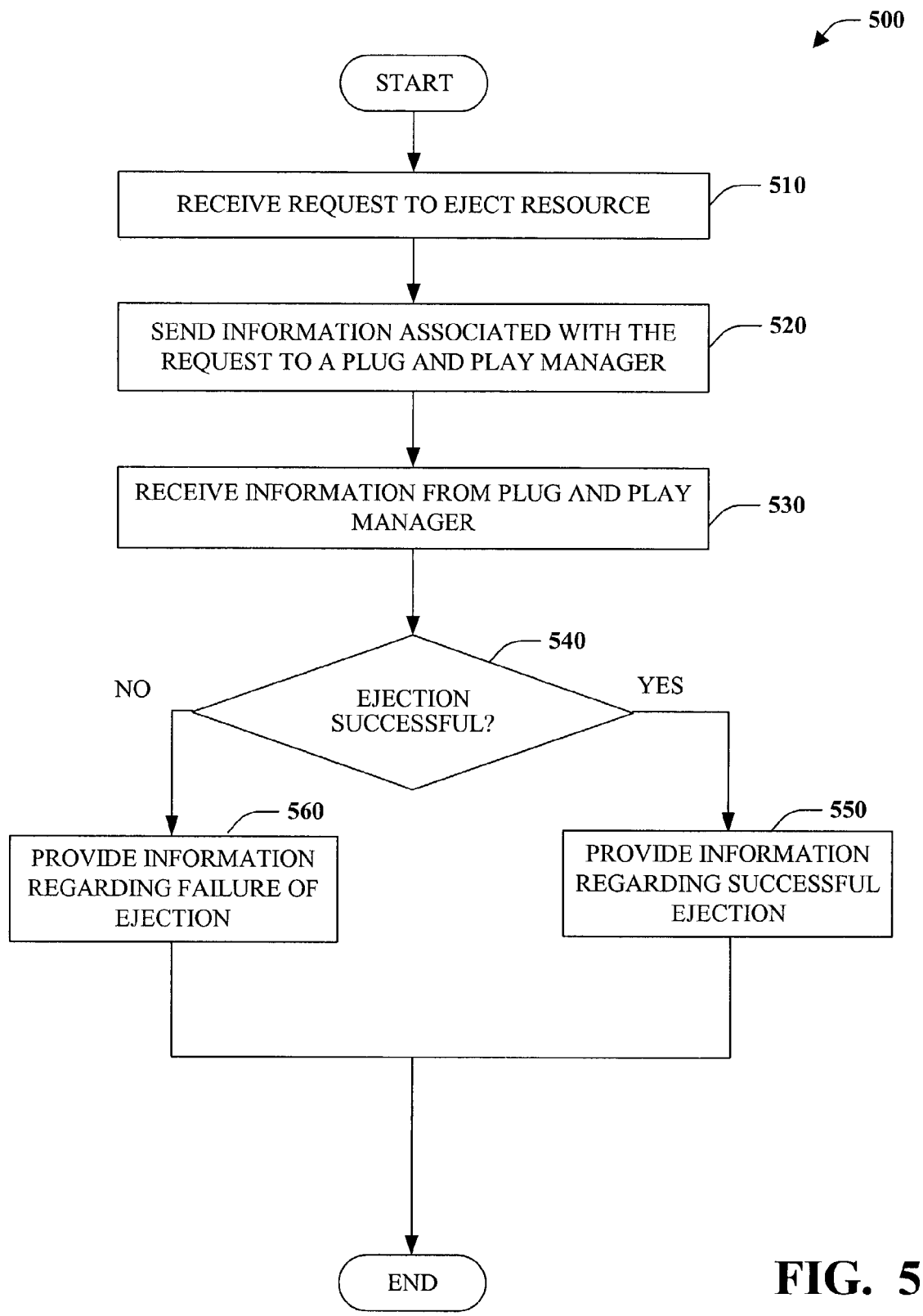
FIG. 5 is a flow chart illustrating a method for providing information associated with a failure of a request to eject an ejectable resource in accordance with an aspect of the present invention.
Figure 6:
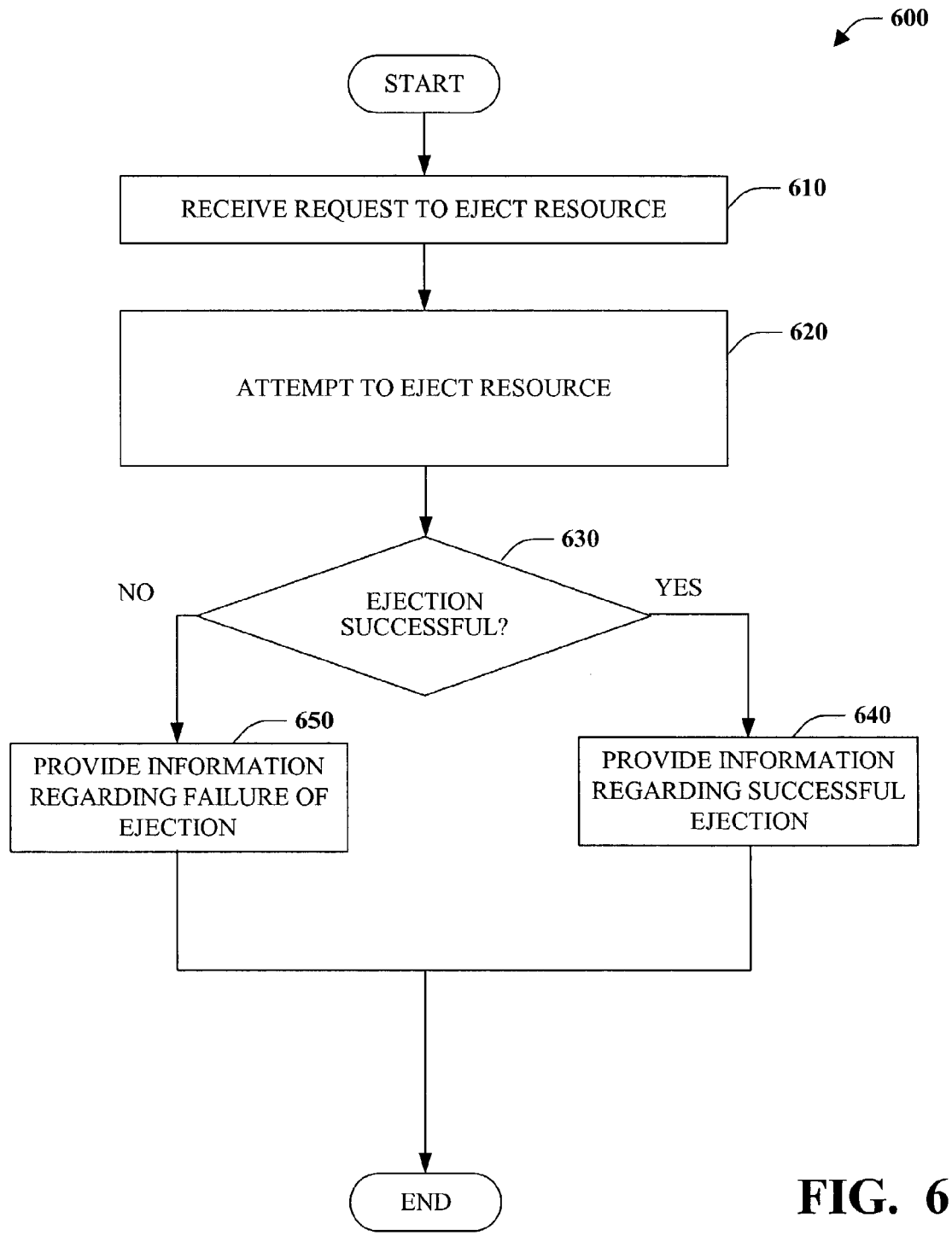
FIG. 6 is a flow chart illustrating a method for providing information associated with a failure of a request to eject an ejectable resource in accordance with an aspect of the present invention.

Turning briefly to FIGS. 5 and 6, methodologies that may be implemented in accordance with the present invention are illustrated. While, for purposes of simplicity of explanation, the methodologies are shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement the methodologies in accordance with the present invention.

The invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 5, a method 500 for providing information associated with a failure of a request to eject an ejectable resource in accordance with an aspect of the present invention is illustrated. At 510, information associated with the request to eject the ejectable resource is received (e.g., by a notification component 140). At 520, information associated with the request to eject the ejectable resource is sent to a plug and play manager (e.g., plug and play manager 110). At 530, information is received from the plug and play manager.

At 540, a determination is made as to whether the ejection was successful. If the determination at 540 is YES, at 550, information associated with successful ejection is provided (e.g., to an initiator of the request to eject) and no further processing occurs. If the determination at 540 is NO, at 560, information associated with the failure of the ejection is provided (e.g., to an initiator of the request to eject) and no further processing occurs.

Turning to FIG. 6, a method 600 for providing information associated with a failure of a request to eject an ejectable resource in accordance with an aspect of the present invention is illustrated. At 610, the request to eject the ejectable resource is received. At 620, the resource is attempted to be ejected. For example, attempting to eject the resource can include unloading a driver associated with the ejectable resource, closing a handle associated with the ejectable resource, and/or cleaning up state associated with the ejectable resource.

At 630, a determination is made as to whether ejection of the ejectable resource has been successful. If the determination at 630 is YES, at 640, information associated with successful ejection is provided (e.g., to a notification component 140) and no further processing occurs. If the determination at 630 is NO, at 650, information associated with the failure of the ejection is provided (e.g., to a notification component 140) and no further processing occurs.

Figure 7:
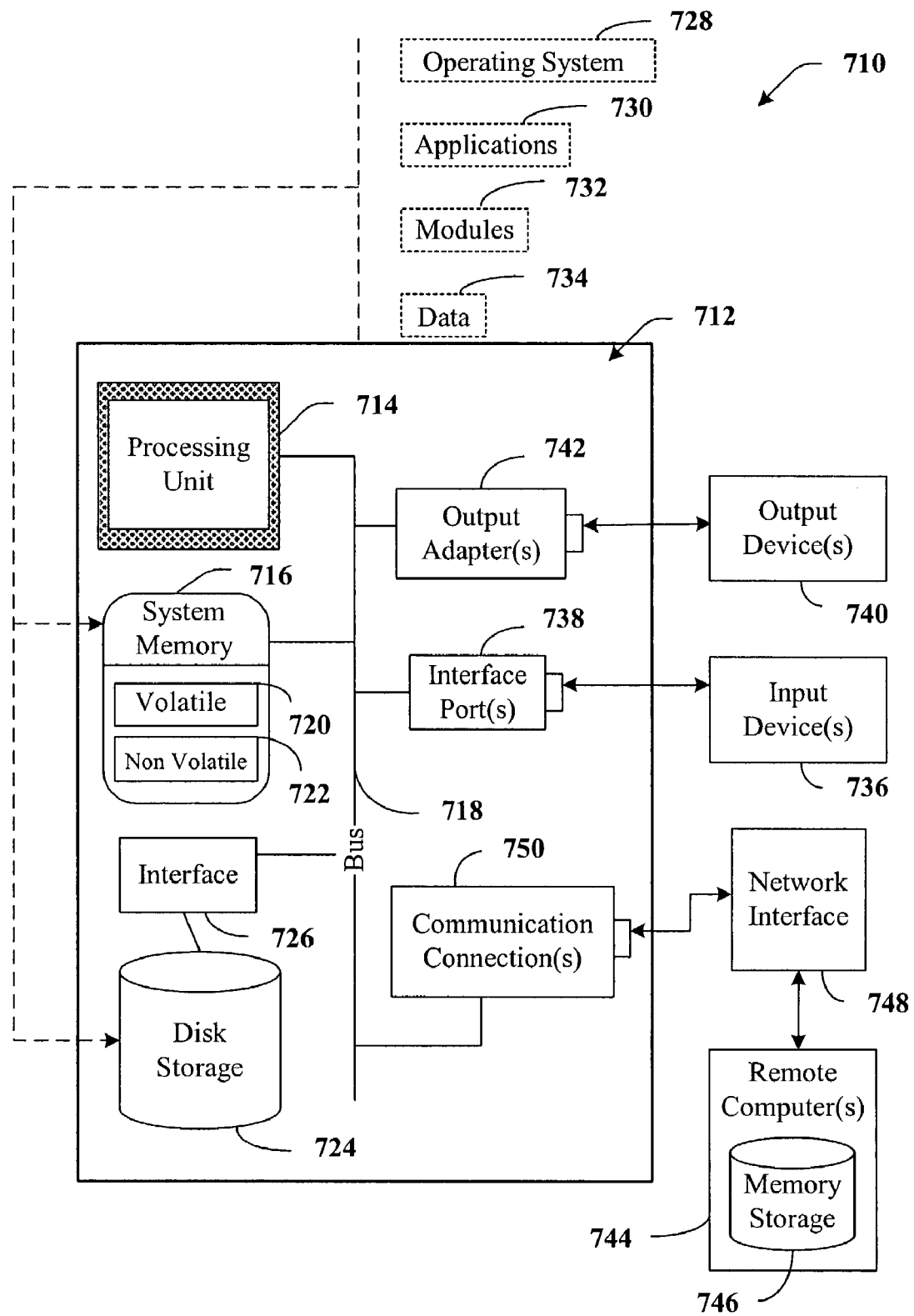
FIG. 7 illustrates an example operating environment in which the present invention may function.

In order to provide additional context for various aspects of the present invention, FIG. 7 and the following discussion are intended to provide a brief, general description of a suitable operating environment 710 in which various aspects of the present invention may be implemented. While the invention is described in the general context of computer-executable instructions, such as program modules, executed by one or more computers or other devices, those skilled in the art will recognize that the invention can also be implemented in combination with other program modules and/or as a combination of hardware and software. Generally, however, program modules include routines, programs, objects, components, data structures, etc. that perform particular tasks or implement particular data types. The operating environment 710 is only one example of a suitable operating environment and is not intended to suggest any limitation as to the scope of use or functionality of the invention. Other well known computer systems, environments, and/or configurations that may be suitable for use with the invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 7, an exemplary environment 710 for implementing various aspects of the invention includes a computer 712. The computer 712 includes a processing unit 714, a system memory 716, and a system bus 718. The system bus 718 couples system components including, but not limited to, the system memory 716 to the processing unit 714. The processing unit 714 can be any of various available processors. Dual microprocessors and other multiprocessor architectures also can be employed as the processing unit 714.

The system bus 718 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 716 includes volatile memory 720 and nonvolatile memory 722. The basic input/output system (BIOS), containing the basic routines to transfer information between elements within the computer 712, such as during start-up, is stored in nonvolatile memory 722. By way of illustration, and not limitation, nonvolatile memory 722 can include read only memory (ROM), programmable ROM (PROM), electrically programmable ROM (EPROM), electrically erasable ROM (EEPROM), or flash memory. Volatile memory 720 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 712 also includes removable/nonremovable, volatile/nonvolatile computer storage media. FIG. 7 illustrates, for example a disk storage 724. Disk storage 724 includes, but is not limited to, devices like a magnetic disk drive, floppy disk drive, tape drive, Jaz drive, Zip drive, LS-100 drive, flash memory card, or memory stick. In addition, disk storage 724 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 724 to the system bus 718, a removable or non-removable interface is typically used such as interface 726.

It is to be appreciated that FIG. 7 describes software that acts as an intermediary between users and the basic computer resources described in suitable operating environment 710. Such software includes an operating system 728. Operating system 728, which can be stored on disk storage 724, acts to control and allocate resources of the computer system 712. System applications 730 take advantage of the management of resources by operating system 728 through program modules 732 and program data 734 stored either in system memory 716 or on disk storage 724. It is to be appreciated that the present invention can be implemented with various operating systems or combinations of operating systems.

A user enters commands or information into the computer 712 through input device(s) 736. Input devices 736 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 714 through the system bus 718 via interface port(s) 738. Interface port(s) 738 include, for example, a serial port, a parallel port, a game port, and a universal serial bus (USB). Output device(s) 740 use some of the same type of ports as input device(s) 736. Thus, for example, a USB port may be used to provide input to computer 712, and to output information from computer 712 to an output device 740. Output adapter 742 is provided to illustrate that there are some output devices 740 like monitors, speakers, and printers among other output devices 740 that require special adapters. The output adapters 742 include, by way of illustration and not limitation, video and sound cards that provide a means of connection between the output device 740 and the system bus 718. It should be noted that other devices and/or systems of devices provide both input and output capabilities such as remote computer(s) 744.

Computer 712 can operate in a networked environment using logical connections to one or more remote computers, such as remote computer(s) 744. The remote computer(s) 744 can be a personal computer, a server, a router, a network PC, a workstation, a microprocessor based appliance, a peer device or other common network node and the like, and typically includes many or all of the elements described relative to computer 712. For purposes of brevity, only a memory storage device 746 is illustrated with remote computer(s) 744. Remote computer(s) 744 is logically connected to computer 712 through a network interface 748 and then physically connected via communication connection 750. Network interface 748 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 750 refers to the hardware/software employed to connect the network interface 748 to the bus 718. While communication connection 750 is shown for illustrative clarity inside computer 712, it can also be external to computer 712. The hardware/software necessary for connection to the network interface 748 includes, for exemplary purposes only, internal and external technologies such as, modems including regular telephone grade modems, cable modems and DSL modems, ISDN adapters, and Ethernet cards.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An ejection failure mechanism system embodied on a computer readable storage medium, comprising:
    a plug and play manager that manages at least one ejectable resource, the plug and play manager comprising an ejection component that facilitates ejection of the ejectable resource based at least upon receipt of a request to eject the ejectable resource, the ejection component providing information associated with a failure of the ejection of the ejectable resource when ejection of the ejectable resource is unsuccessful, the information associated with the failure includes a token storing operating system specific information including one or more parameters indicating a specific cause of the failure, the ejection component utilizes the cause of failure information to undertake corrective action to eject the ejectable resource.

2. The system of claim 1, further comprising a platform component that supports the at least one ejectable resource, the platform component comprising a notification component that provides the request to eject the ejectable resource and receives the information associated with the failure of the ejection of the ejectable resource.

3. The system of claim 2, the notification component further providing at least some of the information associated with the failure of the ejection of ejectable resource to at least one of a service processor and a management console.

4. The system of claim 3, the management console comprising an input device.

5. The system of claim 3, the management console comprising an output device.

6. The system of claim 2, the notification component employing an _EJx control method to facilitate providing at least some of the information associated with the failure of the ejection of the ejectable resource.

7. The system of claim 1, farther comprising a service processor that controls resources available to an operating system-directed configuration and power management component.

8. The system of claim 1, the information associated with the failure of the ejection of the ejectable resource comprising a buffer provided by an operating system, the buffer storing operating system specific information associated with a cause of the failure.

9. An ejection failure mechanism system embodied on a computer readable storage medium comprising:
    a platform component that supports at least one ejectable resource, the platform component comprising a notification component that receives information associated with a request to eject the ejectable resource, provides the information to a plug and play manager, the notification component receives information associated with a failure of the ejection of the ejectable resource from the plug and play manager when ejection of the ejectable resource is unsuccessful, the information associated with the failure is employed by an ejection component to correctively effectuate ejection of the at least one ejectable resource, the information associated with the failure of the ejection of the ejectable resource comprising a token storing operating system specific information including one or more arguments indicating a specific cause of the failure.

10. The system of claim 9, further comprising a plug and play manager that manages the ejectable resource, the plug and play manager comprising the ejection component that facilitates ejection of the ejectable resource based, at least in part, upon the information received from the platform component, the ejection component providing the information associated with the failure of the ejection of the ejectable resource, if ejection of the ejectable resource is unsuccessful.

11. The system of claim 9, the information associated with the failure of the ejection of the ejectable resource comprising a buffer storing operating system specific information associated with a cause of the failure.

12. The system of claim 9, further comprising a service processor that controls resources available to an operating system-directed configuration and power management component.

13. A method for providing information associated with a failure of a request to eject an ejectable resource comprising:
    receiving the request to eject the ejectable resource;
    providing information associated with the request to a plug and play manager; and,
    receiving information from the plug and play manager;
    determining whether ejection of the ejectable resource is unsuccessful based at least upon the information received from the plug and play manager;
    providing information regarding failure of ejection of the ejectable resource when ejection of the ejectable resource is unsuccessful, the information regarding failure of ejection provided as a token that includes operating system specific information including one or more parameters indicating a specific cause of the failure of ejection; and
    utilizing the information regarding failure of ejection to correctively eject the ejectable resource.

14. A method for providing information associated with a failure of a request to eject an ejectable resource comprising:
    receiving the request to eject the ejectable resource;
    attempting to facilitate ejection of the ejectable resource;
    determining whether ejection of the ejectable resource is successful or unsuccessful;
    providing as a token information associated with a failure of the ejection of the ejectable resource when the ejection of the ejectable resource is unsuccessful, the token storing at least operating system specific information including one or more data fields indicating a specific cause of the failure; and undertaking corrective action to effectuate ejection of the ejectable resource based at least on the information associated with the failure of the ejection of the ejectable resource.

15. The method of claim 14, attempting to facilitate ejection of the ejectable resource comprising at least one of the following acts:

unloading a driver associated with the ejectable resource; and, cleaning up state associated with the ejectable resource.

16. A computer readable medium storing computer executable components of an ejection failure mechanism system, comprising:

a plug and play manager component that manages at least one ejectable resource, the plug and play manager component comprising an ejection component that facilitates ejection of the ejectable resource based at least upon receipt of a request to eject the ejectable resource, the ejection component providing information associated with a failure of the ejection of the ejectable resource when ejection of the ejectable resource is unsuccessful, the information associated with the failure of the ejection provided at least as a token storing operating system specific information including one or more parameters indicating specific cause of the failure, the ejection component instigates corrective action to be effectuated to eject the ejectable resource by the ejection component.

17. An ejection failure mechanism system implemented on a computer readable storage medium comprising:

means for managing at least one ejectable resource, the means for managing comprising means for ejecting that facilitates ejection of the ejectable resource; and, means for receiving a request to eject the ejectable resource, the means for ejecting facilitating ejection of the ejectable resource based at least upon receipt of the request to eject, the means for ejecting providing information associated with a failure of the ejection of the ejectable resource as a token comprising operating system specific information including one or more data fields indicating a specific cause of the failure of the ejection when ejection of the ejectable resource is unsuccessful, based on the provided information the means for ejecting initiates corrective action to eject the ejectable resource.

* * * * *

UNITED STATES PATENT AND TRADEMARK OFFICE
CERTIFICATE OF CORRECTION

| | | |
|---|---|---|
| PATENT NO. | : 7,334,217 B2 | |
| APPLICATION NO. | : 10/405726 | |
| DATED | : February 19, 2008 | |
| INVENTOR(S) | : Adam B. Glass et al. | |

It is certified that error appears in the above-identified patent and that said Letters Patent is hereby corrected as shown below:

In column 13, line 64, in Claim 7, delete "farther" and insert -- further --, therefor.

Signed and Sealed this
Fifteenth Day of February, 2011

David J. Kappos
*Director of the United States Patent and Trademark Office*